May 20, 1924.
W. P. HEATH
1,494,420
ICE CREAM OVERRUN HYDROMETER AND PROCESS FOR USING SAME
Filed Dec. 31, 1919
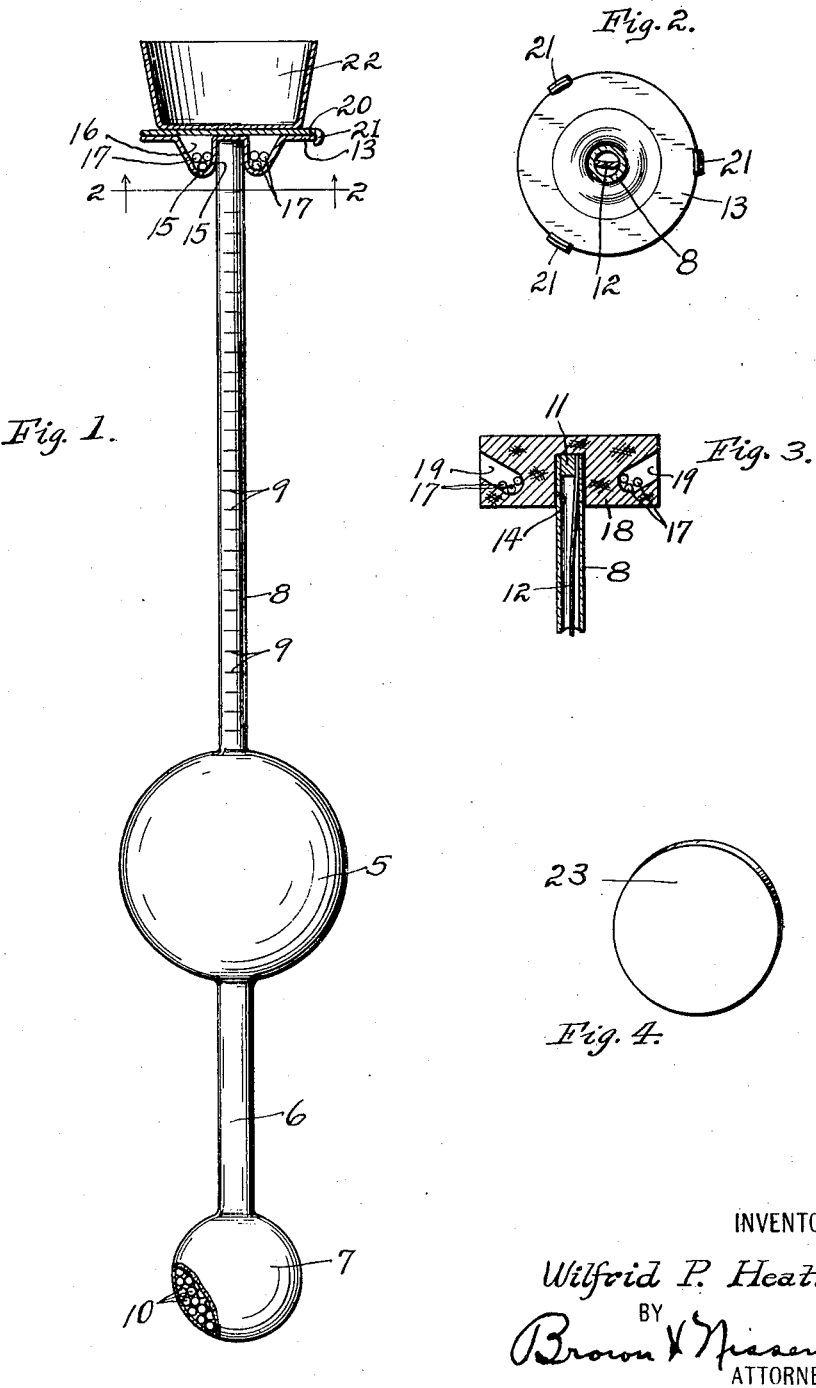
INVENTOR
Wilfrid P. Heath,
BY
Brown & Nissen
ATTORNEYS.

Patented May 20, 1924.

UNITED STATES PATENT OFFICE.

1,494,420

WILFRID P. HEATH, OF CHICAGO, ILLINOIS, ASSIGNOR TO HYDRO MFG. CO., OF CHICAGO, ILLINOIS.

ICE-CREAM OVERRUN HYDROMETER AND PROCESS FOR USING SAME.

Application filed December 31, 1919. Serial No. 348,640.

*To all whom it may concern:*

Be it known that I, WILFRID P. HEATH, a citizen of the United States, residing at Chicago, in the county of Cook and State of Illinois, have invented certain new and useful Improvements in Ice-Cream Overrun Hydrometers and Processes for Using Same, of which the following is a specification.

My invention relates to hydrometers and has for one of its objects the provision of a simple and efficient device of this character to quickly and easily determine the amount of over-run in ice-cream, and the like.

Another object is the provision of a hydrometer having a container mounted thereon of a size having a definite relation to the graduations on a hydrometer scale.

A further object is the provision of a hydrometer having a container mounted thereon with a capacity of definite relation to the hydrometer scale whereby weights may be added to make allowance for the temperatures of the floating medium for the hydrometer.

A still further object is the provision of a process for using a floating hydrometer having a receptacle adapted to contain a quantity of material having a definite relation with the hydrometer graduations for determining the amount of over-run in ice-cream or making analysis by involving titration.

Other objects will appear hereinafter.

An embodiment of my invention is indicated in the accompanying drawing, forming a part of this specification, and in which—

Fig. 1 is a side elevation of a device embodying my invention and showing portions broken away to expose underlying parts;

Fig. 2 is a section taken as on line 2—2 of Fig. 1;

Fig. 3 is a fragmentary vertical section of a modification of my invention; and

Fig. 4 is a perspective view of a weight used in the construction.

Referring more particularly to the drawing, in Fig. 1 I have indicated a hydrometer member having a float chamber 5 with a stem 6 rigidly attached thereto and depended therefrom with a weight bulb 7 attached to the lower end of the member 6. Extending upwardly from the member 5 is a stem 8 upon which graduations 9 are indicated.

The parts 5, 6, 7 and 8 may be made integral or of different parts attached together in any suitable manner. I find that glass makes a good substance for these members, although other materials may be used if desired.

In the bulb 7 weights 10 are provided. These weights 10 may be fine shot or any other material suitable for sinking the hydrometer part of the device to a desired level in a suitable liquid, such as water, not shown. The shots 10 may be dropped down through stem 8, chamber 5 and stem 6 into bulb 7 and then the upper end of stem 8 sealed or otherwise closed. By sealing the upper end no moisture can get into the interior of the hydrometer part to affect the weight thereof. However, when so desired, a cork or other closing member 11 may be slipped tightly into the top of stem 8, as clearly indicated in Fig. 3. Also, the graduations 9 may be formed on a strip of paper or other suitable member 12 when so desired, and this strip 12 inserted in the stem 8, so that the graduations 9 appear through the transparent walls of stem 8. The strip 12 may be held securely in stem 8 by having its upper end clamped by the stopper 10 against the side of stem 8, as clearly indicated in Fig. 3.

At the top of the stem 8 I provide a platform 13 which has a recess 14 in its under side adapted to engage the top of stem 8 so that the platform can be easily and quickly taken from or placed in position on said stem. This platform may be formed in various shapes and manners. In Fig. 1 I have indicated a platform which may be made of metal having a portion 15 struck downwardly to provide the recess 14 and a depression 16 in which weights 17 may be mounted. This platform may also be formed of a piece of cork 18 or other suitable substance having its recess 14 adapted to engage the top end of stem 8. When the platform is formed as by the block 18 one or more recesses 19 may be formed in its side for the reception of the weights 17. Also, various other forms of platforms may be used when so desired.

When a platform, such as indicated in Fig. 1, is used, it is sometimes desirable to provide a smooth top therefor, and in such a case a disc 20 may be placed on top of member 13 and provided with catches 21 to hold the plate 20 onto the platform 13.

On the platform I provide a vessel or container 22 which is adapted to contain a quantity of material having a definite relation to the graduations 9.

The device is suitable for measuring the over-run in ice-cream, that is, the amount of gain in volume of the ice-cream over the original volume of the mix or liquid from which the ice-cream is made. In measuring this over-run the hydrometer part with a platform and vessel 22 in position on the stem 8 is placed in water and a weight of known quantity is placed in the vessel 22. If the water is at the correct temperature this will sink the hydrometer until the surface of the water registers with a particular graduation 9 which might be termed zero. If the water is not at the correct temperature the particular graduation 9 will not be at the top of the water. If the water is too cold one or more of the shots or weights 17 may be placed in the recess 16 or 19 to bring the proper graduation to the top of the water. If the water is too warm then one or more of the shots 17 will have to be removed. When the instrument is properly balanced the weight is removed from cup 22 and the latter filled full and the top stricken off level with ice-cream, then placed back on the platform. The hydrometer will then sink corresponding with the weight of the ice-cream and the particular graduation 9 at the top of the water will indicate the over-run of the ice-cream. In this manner an operator can so manipulate his ice-cream that the over-run can be varied until the required amount is obtained.

Sometimes it is not desirable that the operator know the exact amount of over-run he is putting in in the ice-cream, and in such a case the graduations 9 are so arranged that a chart not known to the operator will be necessary to determine the exact percentage of over-run. For instance, the scale may have one-hundred graduations and the operator told to arrange the over-run so that the hydrometer sinks to a particular graduation on the scale of the hydrometer. The manager or one in charge will, of course, know the amount of over-run when informed of the graduation at the top of the water by the operator. Of course the scale may be arranged so that each graduation on the scale will indicate one or more percentages of over-run so that the scale will indicate exactly the over-run without any computation and may be termed a direct reading scale. In use I find a cup holding about eighty cubic centimeters of suitable size, but it will be apparent that varying the different parts of the hydrometer will require a different sized cup.

Sometimes the ice-cream may be so light that when cup 22 is filled the hydrometer will not sink sufficiently low in the water to bring the first graduation 9 down to the top of the water. In such a case a weight 23 of known quantity can be placed on the platform under cup 22 and then a chart used to interpret the scale of the hydrometer to determine the amount of over-run.

Another use for the device is to ascertain the amount of salt in butter. In this use a zero graduation is provided on the scale of the hydrometer. In the cup 22 is placed a quantity of brine obtained as the result of shaking a sample of butter with a definite weight or proportion of hot water sufficient to sink the hydrometer to the zero graduation. The amount of this brine bears such a relation to the amount of hot water shaken with the butter that when titrated with silver nitrate solution of suitable strength with the addition of a drop of potassium chromate the amount of silver nitrate required indicates the strength of the salt in the butter. The amount of the silver nitrate required to titrate sodium chloride is measured by the depth to which the hydrometer sinks. A chart is used to interpret the reading of the hydrometer.

The device may also be used for testing milk, ice-cream mix or other milk product for lactic acid content. A zero graduation is provided on the scale of the hydrometer and a sufficient quantity of milk product is poured into the cup 22 to bring the zero mark of the hydrometer to the top of the water in which the hydrometer floats. A sodium hydroxide solution to which has been added one or two drops of phenolphthalein indicator is added to the milk product until a slight pink color indicates that the acid in the milk product has been substantially neutralized. The amount of the sodium hydroxide and phenolphthalein solution required to obtain the pink color will sink the hydrometer corresponding to the amount of this solution required to neutralize the acid in the milk product. The reading on the hydrometer scale will indicate when interpreted by a suitable chart the amount of lactic acid in the milk product.

A further use may be to determine the specific gravity of a liquid in which the device is floated. The device is first floated in a quantity of water at a desired temperature and weighted with suitable weights, such as indicated in Fig. 4, until a zero graduation is at the top of the water. Then the device is floated in a liquid of which the specific gravity is desired to be determined. The graduations on the hydrometer scale will indicate the specific gravity of the desired liquid. If the specific gravity of this liquid is lighter than that of water the zero mark of the hydrometer will be above the top of the liquid, and if the liquid is heavier than water the zero mark will be below the top of the liquid. The temperature of the liquid should, of course, be the same as the temperature of water to get the proper relation. Also, to determine the specific gravity of such a liquid a system of weights may be used. Suitable weights are placed on the platform and the number of these weights determine the specific gravity by interpretation on a suitable chart, not shown.

I claim:—

1. The combination with a hydrometer having an upwardly extending stem, of a cup-supporting platform having a recess in its bottom engaging the upper end of said stem and a weight-holding recess in another side of said platform; and weights in the last-mentioned recess, the walls of the latter being disposed to hold the weights in operative position.

2. A platform for hydrometers comprising a piece of sheet material struck up with a hydrometer stem-engaging recess in its lower side, a weight-engaging recess in its upper side and its peripheral and central portions adapted to provide an article to be weighted support.

3. In combination, a hydrometer having an upwardly extending stem open at its top; a strip of sheet material having graduations thereon disposed in said stem; a stopper in the top of said stem clamping said strip; and a cup-supporting platform having a recess in its lower side engaging the upper end of said stem and completely covering said stopper.

4. A platform for hydrometers comprising a sheet metal member having a hydrometer stem-engaging recess struck up in the central portion of its lower side and a weight-receiving recess struck up in its top side around the stem-engaging recess; and a plate disposed on said sheet metal member closing the weight-engaging recess.

5. A platform for hydrometers comprising a member struck up with a hydrometer stem-engaging recess in its lower side and a weight-receiving recess in its top side, and a disc on the upper side of said member with means for removably securing the disc to said member.

6. A platform for hydrometers comprising a disc having its central and edge portions disposed in a plane and an annular depression around said central portion; a plate disposed on said disc and closing said annular depression; and ears on the plate engaging the periphery of said disc locking said plate to said disc.

7. In combination, a hydrometer having an upwardly extending stem open at its top; a stopper in said open top; a graduated strip adjustably held in said stem by said stopper; and a member covering said stopper and the top of the stem.

8. A platform for hydrometer comprising a disc having central and edge portions disposed in a plane and an annular depression around said central portion, and a plate disposed over and enclosing said annular depression.

In testimony whereof I have signed my name to this specification on this 26th day of December, A. D. 1919.

WILFRID P. HEATH.